Jan. 7, 1941.  H. O. ROOSENSTEIN ET AL  2,227,513
SAWTOOTH WAVE GENERATOR
Filed March 26, 1937

INVENTOR
HANS O. ROOSENSTEIN
AND MAX GEIGER
BY
ATTORNEY

Patented Jan. 7, 1941

2,227,513

UNITED STATES PATENT OFFICE 2,227,513

SAW-TOOTH WAVE GENERATOR

Hans Otto Roosenstein and Max Geiger, Berlin, Germany, assignors to Telefunken Gesellschaft für Drahtlose Telegraphie m. b. H., Berlin, Germany, a corporation of Germany Application March 26, 1937, Serial No. 133,139
In Germany April 24, 1936

3 Claims. (Cl. 250—36)

Our invention relates broadly to electric wave generators, and more particularly to an arrangement for generating a serrated or so-called sawtooth wave form for use with television apparatus.

There has been suggested in the prior art a method of generating a saw-tooth shaped alternating potential of symmetric shape wherein the plates of a condenser of opposing polarity have been each charged through a resistance, the two resistances being equal in value, by means of a source of D. C. voltage, and the condenser voltage has been periodically short-circuited by means of a grid controlled discharge tube. Each time the short-circuit is removed the two sets of plates or the two plates as the case may be experience opposite potential variations, and these potential variations may be availed of for the purpose of deflecting the cathode ray beam in a cathode ray tube. The charge on each of the condenser plates undergoes a change of potential after discontinuance of a short-circuit in accordance with a logarithmic function. Each of the sets of condenser plates will approach a maximum equal to one half that of the maximum D. C. voltage source, that is provided, of course, that the short-circuiting of the plates takes place after an interval which is very long in contrast to the time constant of the circuits comprising the condenser and resistance. So far as the production of a saw-tooth wave is concerned, the only portion available for use with a sawtooth is about one-tenth of the ordinate, if a steepness or slope discrepancy of 10% between the beginning and end of the long sawtooth flank is permitted. The necessary D. C. voltage for a saw-tooth curve of a definite desired voltage value is determined from this demand.

In general, we provide two circuits in parallel relationship to each other, each of the circuits containing both active and inactive electrical components, which in this particular case are resistances and condensers and by means of a switching process the voltage required for cathode ray deflection is tapped from two points of the said two-branch circuits which experience opposite potential variations.

Figure 1:
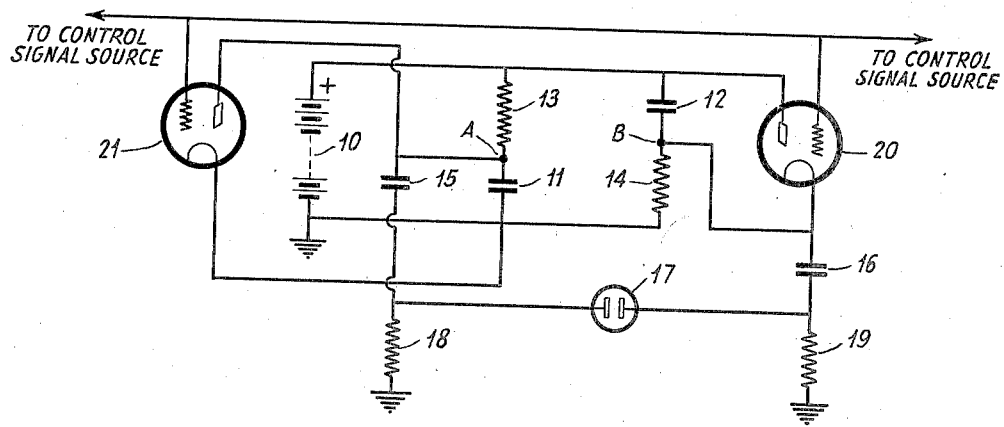
Figure 2:
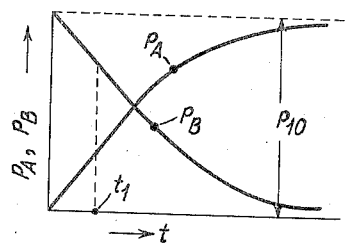
Figure 3:
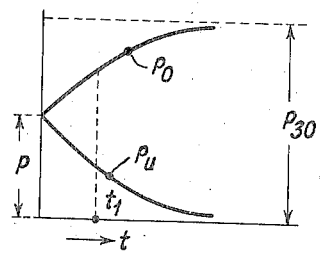
Figure 4:
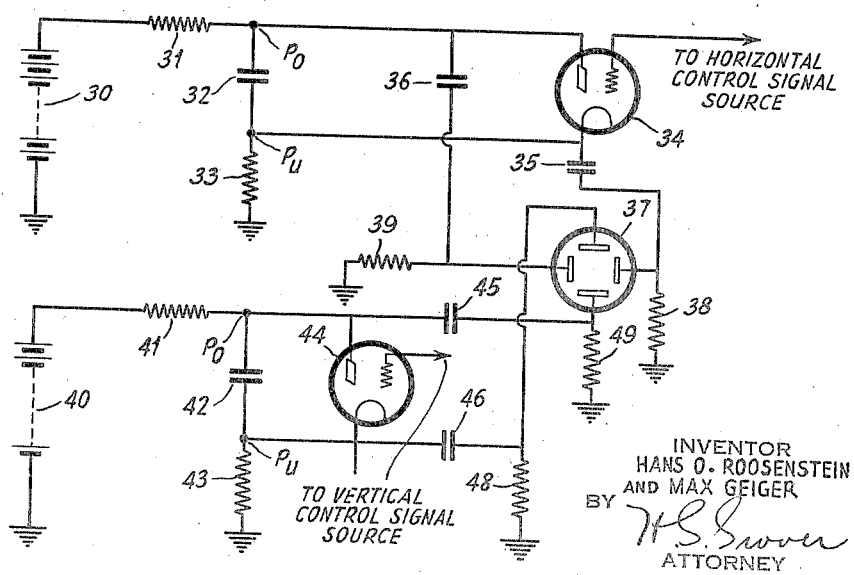

Our invention will best be understood by reference to the accompanying drawing, in which Fig. 1 is an embodiment of our invention, Figs. 2 and 3 are explanatory curves, and Fig. 4 is another embodiment of our invention.

Referring to Fig. 1, the source of D. C. potential 10 has two branch circuits joined in parallel with each other and in series with said battery; each of these parallel circuits comprises a condenser and a resistance, the first of said circuits comprising condenser 11 and resistance 13, and the second of said circuits comprising condenser 12 and resistance 14. The negative terminal of the battery 10 is grounded, and the terminal of condenser 11, remote from the terminal thereof connected to the resistor 13, is connected to the negative terminal of the battery. The terminal of the condenser 12 remote from the terminal thereof joined to resistor 14 is connected to the positive terminal of the battery 10. The common terminal of the condenser 11 and resistor 13 is joined through a coupling condenser 15 and a resistor 18 to ground. The common terminal of the condenser 15 and the resistor 18 is connected to one plate of the deflecting member 17 of the cathode ray tube. The common terminal of resistor 13 and condenser 11 is for purposes of reference hereinafter termed the point A, and the common terminal of the condenser 12 and the resistor 14 is hereinafter referred to as the point B. The point B is connected through coupling condenser 16 and the resistor 19 to ground, and the common terminal of the condenser 16 and the resistor 19 is joined to the other plate of the deflecting means 17. The other deflection plate of the two deflection plates 17 is then joined to the side of condenser 16 which is adjacent the resistance 19. The positive terminal of battery 10 is joined to the plate of a vacuum tube 20, and a point B is connected to the cathode thereof thus providing a discharge path across the condenser 12. The control grid of the tube 20 is adapted to be supplied with impulses which control its conduction so that there is provided a controlled discharge path of condenser 12.

Similarly a vacuum tube 21 is connected across the condenser 11 in order to provide a controlled discharge path for this condenser. The control grids of vacuum tubes 20 and 21 may be joined together so that the two condensers discharge at the same time.

Referring to Fig. 2, there is shown graphically the shape of the potential variations on the side of the condenser 11 adjacent the resistance 13 and also potential variations of the side of the condenser 12 adjacent the resistance 14, each of these being shown as a function of time. $P_A$ shows the potential variations taking place at point A of Fig. 1 and $P_B$ shows the shape of the potential variations taken place at point B with respect to time.

If it be assumed that upon discharge of condenser 11 the charge completely disappears, then the point A will be at ground or zero potential since the condenser has in effect been short-circuited. Upon opening the discharge path, that is to say, upon blocking the tube 21, the condenser will begin to charge through the resistance 13 and the shape of the curve will be logarithmic following the equation $$P_A = P_{10}(1 - e^{\frac{-t}{RC}})$$

After a long time interval, the potential of the point A will approach as a limit a positive potential of the battery 10. On the other hand, when the condenser 12 is short-circuited the point B will assume a potential the same as the potential of the plate of condenser 12 remote from resistance 14, which is the positive potential of battery 10. This condenser will then charge through the resistance 14 in accordance with the equation $$P_B = P_{10} e^{\frac{-t}{RC}}$$

The potentials of the two points A and B being fed by way of coupling condensers 15 and 16 to the deflecting plates 17 will cause the potential of each of these plates to vary in accordance with the potential of the points. This being the case, while the potential of one plate with respect to ground is being increased as a logarithmic function, the potential of the other plate is being decreased accordingly. Therefore, in effect only half of the original supplied voltage piece of 10 is needed in this system as compared with the ordinary arrangements for effecting deflection by means of the usual single condenser charge and discharge now in general use.

Referring to Fig. 3, there is shown the graphs representing the potential variations of a modified arrangement hereinafter described with refernce to Fig. 4. A short analysis of Fig. 4 will be given in conjunction with the graph of Fig. 3.

Referring to Fig. 4 there is shown an arrangement for actuating both the vertical and horizontal deflection apparatus. As both the vertical and horizontal deflecting means are identical in operation, only the function of one will be described. A source of direct current potential 30 is grounded on its negative pole and the positive pole is connected in series with a resistance element 31. Also joined in series with resistance 31 is a condenser 32 and another resistance 33, the latter usually being equal in value to resistance 31 and being grounded at its extremity remote from the condenser. Connected across the condenser 32 is the plate circuit of an electron discharge tube 34 whose grid is adapted to be supplied with control impulses. Also connected with the plate cathode circuit are two coupling condensers 35 and 36. Each of the coupling condensers is joined to one deflecting plate of a representative pair 37, and these plates are grounded through resistances 38 and 39.

When the condenser 32 has been shortcircuited by means of rendering the electron tube 34 conductive, both points $P_O$ and $P_U$ assume a potential equal to approximately half of that of the supply 30. When the electron tube is blocked, the potential at the point $P_O$ will rise with respect to this grid potential P in a manner determined by an exponential formula hereinbeore referred to, and the potential at the point $P_U$ will drop with respect to the mid-potential P in a manner determined by an exponential formula hereinbefore referred to. Accordingly, the potential of the opposing plates of the deflecting plates 37 will vary in the manner shown, and again a D. C. source of only half the usual amount is necessitated. Fig. 4 shows the use of such an apparatus for both horizontal and the vertical deflecting plates, and in each case the electron discharge path may be energized or controlled by the incoming synchronizing impulses.

In view of the exponential rise and fall of potential at the hereinbefore referred to points, there is used only that portion of each of the potential waves which will reach to, say, a value equal to that indicated on the graphs at the point $t_1$. At this instant, the electron discharge tubes which act as a conducting path are rendered conductive and the condenser or condensers discharged across this path. These tubes may be used to work in a so-called blocking oscillator circuit or else in a self-biasing circuit scheme in which the negative grid biasing voltage is generated by the grid itself, and this renders possible a simpler circuit arrangement as compared with the case where the negative grid biasing voltage, for instance, is produced by rectification of an alternating potential. Such arrangements are illustrated in United States applications Serial No. 132,941 filed March 25, 1937, of Max Geiger and the Robert Andrieu application Serial No. 128,089 filed February 27, 1937.

It is also feasible to use a mechanical switch as well as the electron discharge tube particularly for the vertical deflecting means since this takes place comparatively slowly. This modified form of construction from the viewpoint of operating properties is advantageous for the reason that by mechanical adjustment of the tube contacts of the switch, both condensers may be discharged at the same instant.

What we claim is:

1. An oscillation generator for developing a push-pull saw-tooth wave form comprising a series circuit which includes a first resistive means, a first condenser, a second resistive means and a second condenser in the order named, said first resistive means and first condenser having the same time constant, as said second condenser and second resistive means, a single source of potential for charging said condensers through said resistive means, said source having its positive terminal connected between the second condenser and the first resistive means and its negative terminal connected between the first condenser and the second resistive means, an output circuit having terminals one of which is connected between the first resistive means and condenser and the other of which is connected between the second condenser and second resistive means, and discharge means for said condensers.

2. Apparatus in accordance with claim 1 wherein said discharge means for said condensers comprises a thermionic discharge tube having the anode-cathode path thereof connected substantially in parallel with each of said condensers.

3. Apparatus in accordance with claim 1 wherein said discharge means for said condensers comprises a thermionic discharge tube containing an anode, cathode and at least one control electrode and wherein the anode-cathode discharge path thereof is connected substantially parallel with each of said condensers and the discharge state thereof is controlled in accordance with signals received from an external source.

HANS OTTO ROOSENSTEIN.
MAX GEIGER.